United States Patent
Gokavarapu et al.

(10) Patent No.: US 10,990,451 B2
(45) Date of Patent: Apr. 27, 2021

(54) EFFICIENT HANDLING OF TRIGGER TRANSACTIONS IN A WORKLOAD MANAGEMENT ENVIRONMENT

(71) Applicant: International Business Machines Corporation, Armonk, NY (US)

(72) Inventors: Nageswararao Venkata Gokavarapu, Bangalore (IN); Jithesh Moothoor, S. Medahalli (IN); Raghavendran Srinivasan, Bangalore (IN); Madhu B. Ananthapadmanabh, Bangalore (IN); Chaitanya Vutukuru, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/265,402

(22) Filed: Feb. 1, 2019

(65) Prior Publication Data
US 2020/0250011 A1    Aug. 6, 2020

(51) Int. Cl.
*G06F 9/50* (2006.01)
*G06F 9/46* (2006.01)

(52) U.S. Cl.
CPC ............ *G06F 9/5083* (2013.01); *G06F 9/466* (2013.01); *G06F 9/5011* (2013.01)

(58) Field of Classification Search
CPC ....... G06F 9/5083; G06F 9/466; G06F 9/5011
USPC ........................................................ 718/105
See application file for complete search history.

(56) References Cited

U.S. PATENT DOCUMENTS

| | | | |
|---|---|---|---|
| 6,950,867 B1 * | 9/2005 | Strohwig | G06Q 40/04 709/224 |
| 7,653,905 B1 | 1/2010 | Lingamneni | |
| 8,973,001 B2 | 3/2015 | Russell | |
| 2009/0217274 A1 * | 8/2009 | Corbin | G06F 16/2471 718/101 |
| 2012/0257566 A1 * | 10/2012 | Le | H04L 45/308 370/328 |

OTHER PUBLICATIONS ibm.com/redbooks,"CICS Transaction Server From Start to Finish" Dec. 2011, 410 pages.
(Continued)

*Primary Examiner* — Jae U Jeon
*Assistant Examiner* — Bradford F Wheaton
(74) *Attorney, Agent, or Firm* — Patterson + Sheridan, LLP

(57) ABSTRACT

Techniques for handling transactions are provided. A first transaction is received at an application system of a distributed system. The first transaction is completed, where completing the first transaction comprises writing a record to a queue. A response is generated by an application resource monitor (ARM) of the application system, where the response identifies the record and the application system. The response is transmitted to a transaction distribution system, where the transaction distribution system distributes transactions among application systems in the distributed system. A second transaction is received at the application system. Upon determining that the second transaction is a trigger transaction, the ARM determines a plurality of records that are associated with the second transaction, where the plurality of records includes the record. The ARM retrieves the record from the queue, and completes the second transaction based at least in part on the record.

18 Claims, 6 Drawing Sheets

(56) References Cited

OTHER PUBLICATIONS

Oracle Tuxedo Application Runtime for CICS Reference Guide, 11g Release 1 (11.1.1.2), 150 pages.
ip.com Disclosure No. IPCOM000244612D, "Method for Efficient Handling of Resource Affinity in a Workload Managed Multi-Process Middleware Environment," Dec. 29, 2015 (Abstract Only).

\* cited by examiner

| TRANSACTION NAME 305 | TRIGGER 310 | TRIGGER COUNT 315 | TRIGGER TRANSACTION 320 | CURRENT COUNT 325 | WRITE RECORD DETAILS 330 |
|---|---|---|---|---|---|
| ABC | Q1 | 5 | DEF | 2 | AS: 1; RN: 4<br>AS: 4; RN: 1 |
| GHI | Q2 | 3 | JKL | 0 | |
| UVW | Q3 | 10 | XYZ | 1 | AS: 3; RN: 2 |

245

350A: ABC row
350B: GHI row
350N: UVW row

EFFICIENT HANDLING OF TRIGGER TRANSACTIONS IN A WORKLOAD MANAGEMENT ENVIRONMENT

BACKGROUND

The present disclosure relates to workload load management, and more specifically, to handling trigger transactions in distributed workload environments.

In transaction processing monitor (TPM) environments, workload managers are often deployed to scale the system and provide high availability. Frequently, operations are distributed among multiple entities or systems to enable this scalability and reliability. In these distributed environments, resources are generally tightly bound to each entity, such that each of the application systems has independent memory, storage, processing capability, and the like. While this ensures reliability, it causes significant issues when there is data that needs to be shared among the operators. Existing solutions either do not allow this interoperability, or do so in an inefficient and sub-optimal manner.

SUMMARY

According to one embodiment of the present disclosure, a method is provided. The method includes receiving a first transaction at a first application system of a plurality of application systems of a distributed system. The method further includes completing the first transaction, wherein completing the first transaction comprises writing a first record to a first queue. Additionally, the method includes generating, by a first application resource monitor (ARM) of the first application system, a first response, wherein the first response includes (i) an identifier of the first record and (ii) an identifier of the first application system. The method then includes transmitting, by the first ARM, the first response to a transaction distribution system, wherein the transaction distribution system distributes transactions among the plurality of application systems in the distributed system. A second transaction is then received at the first application system. Upon determining that the second transaction is a trigger transaction, the method includes determining, by the first ARM, a first plurality of records that are associated with the second transaction, wherein the first plurality of records includes the first record, retrieving, by the first ARM, the first record from the first queue, and completing the second transaction based at least in part on the first record.

According to a second embodiment of the present disclosure, a computer-readable storage medium is provided. The computer-readable storage medium has computer-readable program code embodied therewith, which is executable by one or more computer processors to perform an operation. The operation includes receiving a first transaction at a first application system of a plurality of application systems of a distributed system. The operation further includes completing the first transaction, wherein completing the first transaction comprises writing a first record to a first queue. Additionally, the operation includes generating, by a first application resource monitor (ARM) of the first application system, a first response, wherein the first response includes (i) an identifier of the first record and (ii) an identifier of the first application system. The operation then includes transmitting, by the first ARM, the first response to a transaction distribution system, wherein the transaction distribution system distributes transactions among the plurality of application systems in the distributed system. A second transaction is then received at the first application system. Upon determining that the second transaction is a trigger transaction, the operation includes determining, by the first ARM, a first plurality of records that are associated with the second transaction, wherein the first plurality of records includes the first record, retrieving, by the first ARM, the first record from the first queue, and completing the second transaction based at least in part on the first record.

According to a second embodiment of the present disclosure, a system is provided. The system includes a memory containing a program which when executed by the one or more computer processors performs an operation. The operation includes receiving a first transaction at a first application system of a plurality of application systems of a distributed system. The operation further includes completing the first transaction, wherein completing the first transaction comprises writing a first record to a first queue. Additionally, the operation includes generating, by a first application resource monitor (ARM) of the first application system, a first response, wherein the first response includes (i) an identifier of the first record and (ii) an identifier of the first application system. The operation then includes transmitting, by the first ARM, the first response to a transaction distribution system, wherein the transaction distribution system distributes transactions among the plurality of application systems in the distributed system. A second transaction is then received at the first application system. Upon determining that the second transaction is a trigger transaction, the operation includes determining, by the first ARM, a first plurality of records that are associated with the second transaction, wherein the first plurality of records includes the first record, retrieving, by the first ARM, the first record from the first queue, and completing the second transaction based at least in part on the first record.

BRIEF DESCRIPTION OF THE SEVERAL VIEWS OF THE DRAWINGS

FIG. 3 illustrates a monitoring structure used to efficiently handle trigger transactions, according to one embodiment disclosed herein.

DETAILED DESCRIPTION

Figure 1:
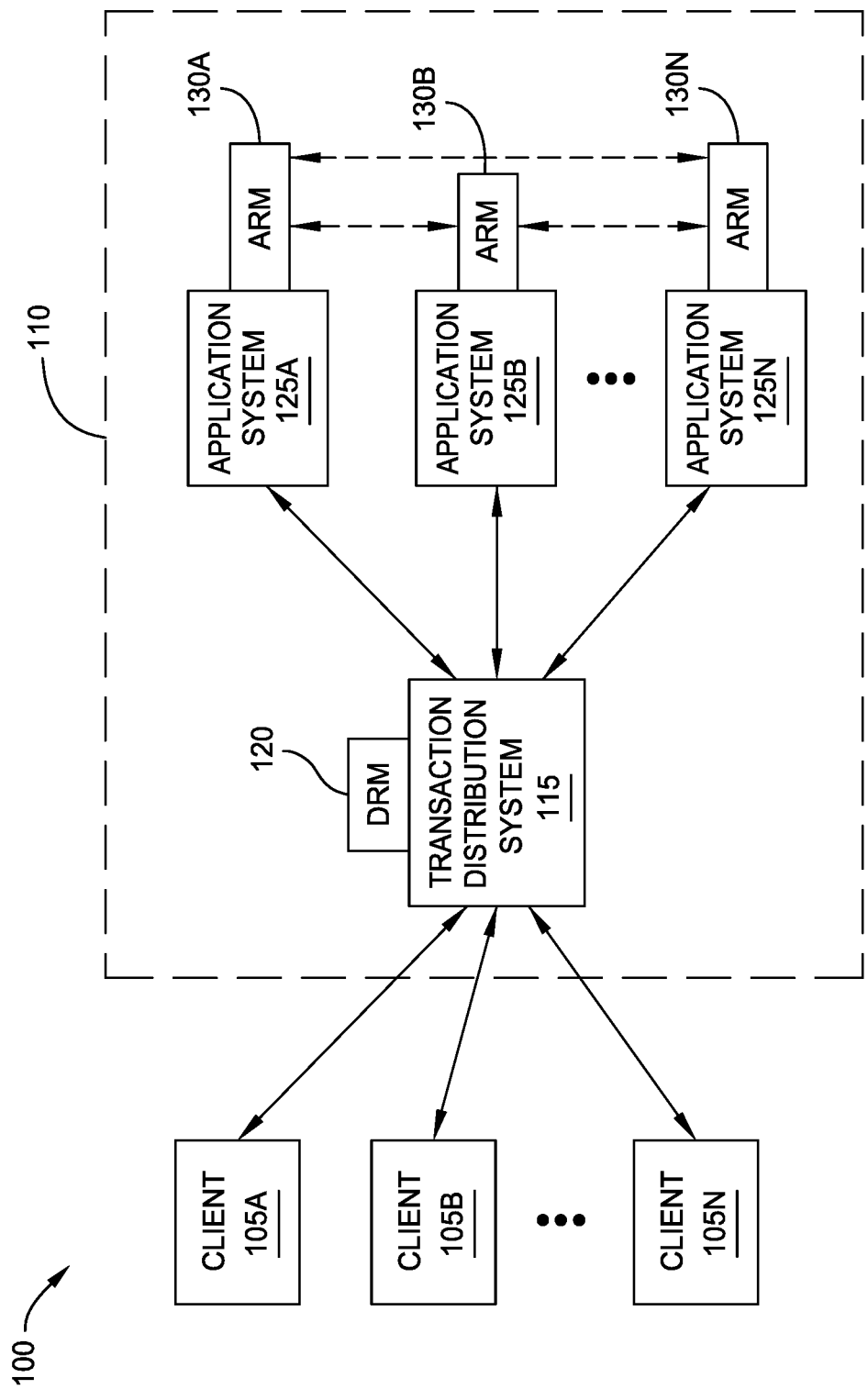
FIG. 1 illustrates a distributed application environment configured to efficiently handle trigger transactions, according to one embodiment disclosed herein.

In embodiments of the present disclosure, operations (e.g., transactions) are routed to different application instances or systems based on load and other factors. In one embodiment, the application systems are identically configured (or perform identical operations), such that a given transaction can be routed to any of the systems for execution. In many cases, each system has its own set of resources that are tightly bound to the particular application region. For example, each application system or region may have its own allocation of memory, storage, processing capabilities, and the like. In an embodiment, the application regions receive transactions or other data from a distribution system or region and perform the required operations. For example, these operations can include updating a database or other storage structure, completing operations or transformations of data, transmitting data to one or more other entities (or returning a response to the distribution system or client), and the like.

In some embodiments, certain transactions can trigger other transactions or operations to be initiated. In one embodiment, completing some transactions involves writing data to one or more queues. When the queue reaches a predefined length, in an embodiment, a separate trigger transaction is initiated to perform additional operations. For example, a set of transactions may record new orders in a queue, and a trigger transaction may process or finalize these orders (e.g., by forwarding them to a logistics department) once the queue reaches a predefined length. However, if the original transactions (e.g., the new orders) are processed in a distributed system (such as an online transaction processing or OLTP environment), the transactions (and thus the records that are created) may be located on any number of different application systems or instances. As the resources of each system (including the queues) are tightly bound to the region, existing systems do not allow the records to be tracked between regions, which means that trigger transactions cannot be initiated when required (e.g., when the cumulative records across all regions meet the required criteria, even when any one region does not satisfy the criteria).

Thus, because the environment requires each application to be isolated, from a resource perspective, and because the transactions can be routed to any of the applications, the model will fail if interdependency is required between the regions. In some systems, rather than provide each application instance with its own set of resources, a separate data region is maintained which is used by all of the applications. By enabling each application system or instance to access the same data store, the trigger transactions can be properly initiated, because all of the records are stored in a single location. However, in such an embodiment, because each application uses the same data region for read/write operations (and thus must lock the relevant addresses whenever a read or write is to be performed), lock contention can become a serious issue that prevents efficient use of the shared resources. Further, adding a separate data region requires additional infrastructure and configurations which can cause inefficiencies and added expenses.

In embodiments of the present disclosure, efficient handling of these interdependencies is provided through the use of a distribution resource monitor (DRM) at the distribution point (e.g., the point where transactions are distributed among the various application systems), as well as a respective application resource monitor (ARM) associated with each of the application instance. In embodiments, the DRM and ARMs enable transactions to be monitored in a way that prevents contentious resource locks, maintains resource independence, guarantees interoperability between the regions, and improves efficiency of the distributed system.

FIG. 1 illustrates a distributed application environment 100 configured to efficiently handle trigger transactions, according to one embodiment disclosed herein. In the illustrated environment, a number of Clients 105A-N are communicatively coupled with a Transaction Distribution System 115 in a Distributed System 110. In one embodiment, the Distributed System 110 is a Customer Information Control System (CICS) that utilizes OLTP to manage transactions. Although three Clients 105 are illustrated, in embodiments, there may be any number of Clients 105. In an embodiment, the Clients 105A-N transmit transactions or requests to the Distributed System 110 (e.g., via a local network or via the Internet), and the Transaction Distribution System 115 distributes them among Application Systems 125A-N, based on the current or expected load at each Application System 125A-N, available resources, and the like. In some embodiments, the Transaction Distribution System 115 is referred to as a client-owning region (COR). Although a single Transaction Distribution System 115 is illustrated, in embodiments, there may be any number of Transaction Distribution Systems 115 in the Distributed System 110.

In the illustrated embodiment, each Application System 125A-N receives transactions from the Distribution System 115, and performs the requested or required operations. In some embodiments, the Application Systems 125 are also referred to as application-owning regions (AORs). In embodiments, the operations can include reading, writing, or modifying data in a data store (e.g., a database or queue), transforming data, transmitting data to one or more other regions or entities, returning data to one or more Clients 105 (e.g., via the Transaction Distribution System 115), and the like. Although three Application Systems 125A-N are illustrated, in embodiments, there may be any number of Application Systems 125 in the Distributed System 110. In an embodiment, each Application System 125 A-N has an accompanying set of resources, including memory, storage, processor capacity, and the like. In one embodiment, some or all of these resources are reserved for the particular Application Systems 125A-N, and are not shared between regions. In embodiments, each Application System 125 may correspond to a physical machine or cluster of machines, a virtual machine or cluster of virtual machines, a defined region in memory where an instance of the application is executed, and the like.

In the illustrated embodiment, each Application System 125A-N is associated with a respective Application Resource Monitor (ARM) 130A-N. In one embodiment, each ARM 130A-N, at initialization, identifies the trigger transactions that the Application System 125A-N is configured to utilize (if any). For example, the software or logic associated with an Application System 125A-N may indicate that when a particular queue reaches a predefined capacity, a trigger transaction is to be initiated to read all of the records off the queue and performs some operation on them. In an embodiment, the ARM 130A-N identifies this trigger (and any other triggers that are defined), and gathers information about the trigger. For example, in one embodiment, the ARM 130A-N determines the type of transaction that causes the trigger (e.g., the transaction(s) that write to the queue), the data involved in the trigger (e.g., the queue(s) that are to be monitored), the trigger transaction that is to be initiated upon the criteria being satisfied, what the predefined criteria are (e.g., a number of records in the queue), and the like.

Once this trigger information is determined, in an embodiment, each ARM 130A-N transmits it to the Distribution Resource Monitor (DRM) 120. In embodiments, the trigger information can include metadata about any number of triggers, and can be received from any number of Application Systems 125A-N. In an embodiment, upon receiving the trigger information, The DRM 120 creates a data structure for monitoring the triggers. In one embodiment, the DRM 120 creates a table with a separate entry for each trigger. That is, in an embodiment, each entry corresponds to a particular condition (or set of conditions) that cause one or more trigger transactions to be initiated. For example, if one trigger causes a trigger transaction to read and process records on a queue once the queue reaches a predefined size, a corresponding entry would be made in the table for this trigger. In an embodiment, the trigger includes an indication as to transaction(s) that cause the trigger to be tripped, the data affected (e.g., the queue(s) where the records are stored), an indication of the criteria (e.g., the predefined number of records necessary to trip the trigger), and an indication of the trigger transaction that is to be initiated when the criteria are satisfied.

In one embodiment, the entry also includes an indication as to the current status of the corresponding data (e.g., the current number of records stored in the queue(s)), and/or the identity or location of the data (e.g., the particular location of each of the relevant records). In some embodiments, the Transaction Distribution System 115 receives transaction requests from one or more Clients 105A-N, and routes them to any of the Application Systems 125A-N. In an embodiment, the corresponding ARM 130 of the selected Application System 125 monitors the completion of the required operations. If the transaction affects a trigger that was identified during initialization (e.g., if the transaction writes to a queue that is being monitored), the ARM 130 collects metadata about the completion of the transaction, and transmits it to the DRM 120. For example, if the transaction writes a record to the queue, the ARM 130 can generate a communication including an identifier of the queue, an identifier of the Application System 125, a current number of records in the queue, and the like.

Upon receiving this transmission, in an embodiment, the DRM 120 updates the monitoring data structure (e.g., a table) to update the current status of the data (e.g., by incrementing the counter). In some embodiments, the DRM 120 further stores the identified location of the newly created record or other data that was stored by the Application System 125. In embodiments, if the trigger criteria are satisfied (e.g., the number of records matches the predefined trigger count), the DRM 120 generates one or more trigger transactions based on the effect specified in the table. In an embodiment, the DRM 120 associates metadata with the trigger transaction, specifying the location(s) of all of the relevant data or records. This trigger transaction can then be forwarded to any of the Application Systems 125A-N.

In embodiments, upon receiving the trigger transaction, the ARM 130 of the recipient Application System 125 extracts the metadata associated with it, and retrieves all of the data or records that are available locally (e.g., all of the records that are located on the recipient Application System 125). If any records are stored by another Application System 125A-N, in an embodiment, the ARM 130 creates a dynamic connection to the ARM 130 of the identified Application System(s) 125 (as illustrated by the dotted arrows in FIG. 1), and requests the identified data or records. Once all of the records have thus been retrieved, in an embodiment, the Application System 125 that received the trigger transaction can complete the transaction by performing the specified or required operations using the retrieved data.

Thus, embodiments of the present disclosure enable the Application Systems 125A-N to interoperate via the ARMs 130A-N, without requiring shared resources that can cause dependency issues or contentious locks. In an embodiment, the Application Systems 125A-N are disconnected from each other, except for via their respective ARMs 130A-N. In this way, the resources of each Application System 125 are shared (or locked) only when a trigger transaction is being executed, only if the particular Application System 125 has one or more relevant records for the transaction, and only for a brief period of time. Further, because the DRM 120 maintains data about the current state of the system across all Application Systems 125, the intent of the trigger logic is maintained despite the distributed nature of the environment. For example, suppose a trigger specifies that the queue should be flushed (and all records processed) once the queue reaches a size of 10. In one embodiment, each Application System 125 can monitor its own queue and initiate its own trigger transaction when its local queue reaches 10. However, in such an embodiment, there may be many more than ten records spread across the Application Systems 125A-N. To ensure that the original intent is carried out (e.g., that the trigger occurs when ten records exist anywhere in the system), therefore, the DRM 120 can cause the trigger transaction to be initiated when the total number of records across the entire environment meets the specified criteria.

Figure 2:
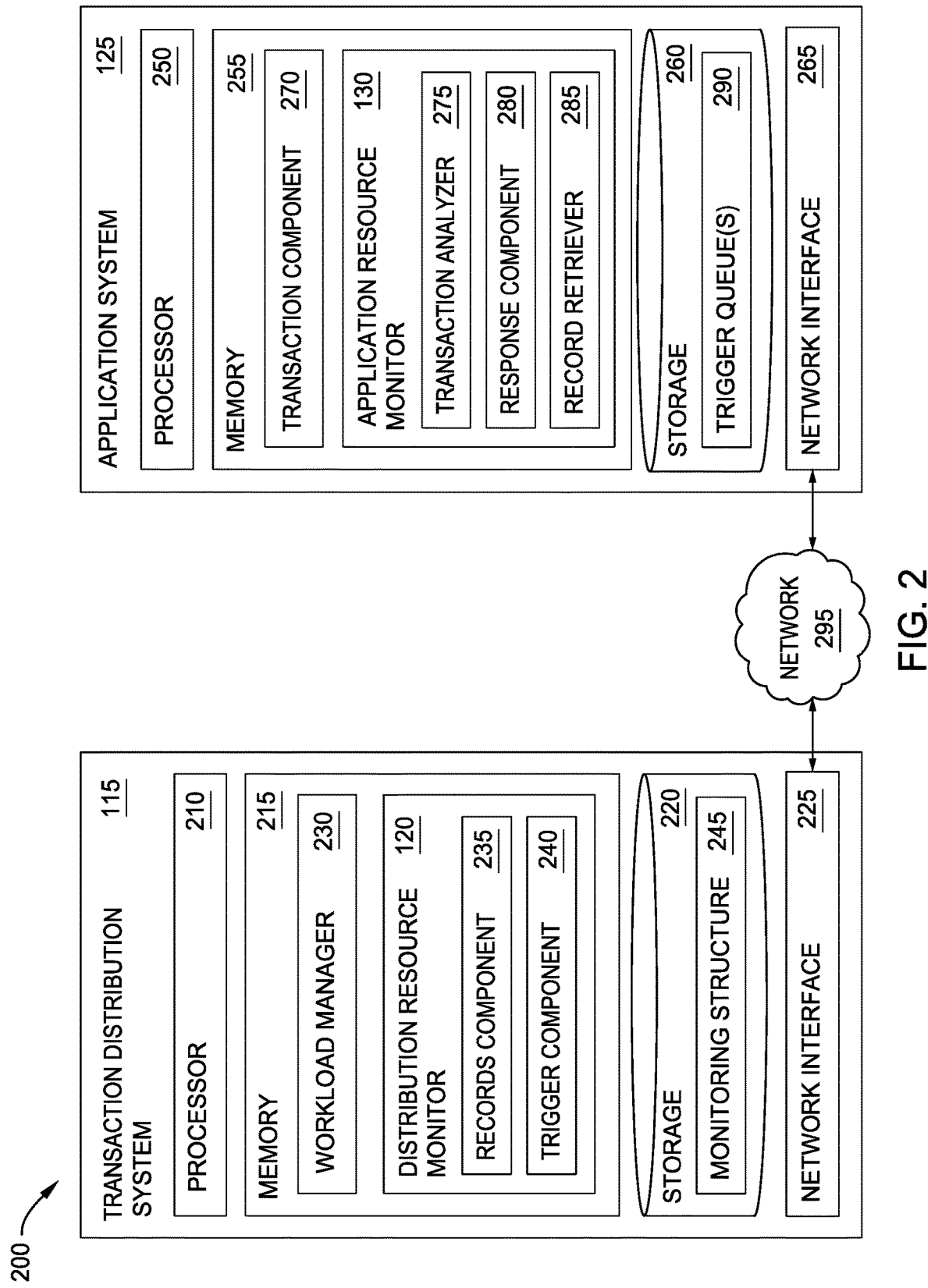
FIG. 2 is a block diagram illustrating a transaction distribution system and an application system, according to one embodiment disclosed herein.

FIG. 2 is a block diagram illustrating a Transaction Distribution System 115 and an Application System 125, according to one embodiment disclosed herein. In the illustrated embodiment, the Transaction Distribution System 115 and Application System 125 are communicatively coupled via a Network 295. In embodiments, the Network 295 can include wired connections, wireless connections, or a combination of wired and wireless links. In some embodiments, the Network 295 is a local area network (LAN) or a wide area network (WAN). In one embodiment, the Network 295 includes internal communications links within a single machine or a cluster of machines. In at least one embodiment, the Network 295 is the Internet.

As illustrated, the Transaction Distribution System 115 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Via the Network Interface 225, the Transaction Distribution System 115 can be communicatively coupled with other entities including Clients 105, Application Systems 125, and the like.

Although illustrated as a physical machine, in embodiments, the functionality of the Transaction Distribution System 115 can be implemented as one or more physical or virtual machines, and can operate via hardware, software, or a combination of hardware and software. As illustrated, the Storage 220 includes a Monitoring Structure 245. In an embodiment, the Monitoring Structure 245 includes entries or records for each trigger that exists in the distributed system, as discussed in more detail below with reference to FIG. 3.

In the illustrated embodiment, the Memory 215 includes a Workload Manager 230 and a DRM 120. Although illustrated as discrete components, in embodiments, the functionality of the Workload Manager 230 and DRM 120 may be combined or distributed across any number of components, and may be implemented using hardware, software, or a combination of hardware and software. In an embodiment, the Workload Manager 230 receives transactions or requests from Clients 105. For each transaction, the Workload Manager 230 selects one of the available Application Systems 125, and transmits the transaction to the selected system. In an embodiment, this selection can be based on load balancing, among other factors. In some embodiments, the Workload Manager 230 also receives trigger transactions generated by the DRM 120, and similarly selects an Application System 125 to process the transaction.

In the illustrated embodiment, the DRM 120 includes a Records Component 235 and a Trigger Component 240. Although illustrated as discrete components, in embodiments, the functionality of the Records Component 235 and Trigger Component 240 may be combined or distributed across any number of components, and may be implemented using hardware, software, or a combination of hardware and software. In one embodiment, the Records Component 235 receives the initialization data from the Application Systems 125 (e.g., the trigger information) and creates the Monitoring Structure 245, which is illustrated as residing in Storage 220. Although depicted as residing in Storage 220, in embodiments, the Monitoring Structure 245 may be located in Memory 215, or in any other suitable location. As discussed above, in an embodiment, the Monitoring Structure 245 is used to track the current state of the distributed system, with respect to the various trigger(s) that exist.

In an embodiment, the Records Component 235 also receives responses or transmissions from the Application Systems 125 (e.g., from the ARMs 130) when a data involved in a trigger is modified. For example, when a monitored queue is written to, the ARM 130 can generate and transmit a communication including metadata about the operation. In the illustrated embodiment, the Records Component 235 updates the Monitoring Structure 245 based on these responses. In the illustrated embodiment, the Trigger Component 240 monitors the Monitoring Structure 245 to determine whether the trigger condition(s) are satisfied for any particular trigger. If so, the Trigger Component 240 generates the corresponding trigger transaction, and includes metadata indicating the implicated data (e.g., the location of each record that is related to the trigger). In one embodiment, the Trigger Component 240 then transmits the trigger transaction to any one of the Application Systems 125 for execution. In some embodiments, the Trigger Component 240 passes the trigger transaction to the Workload Manager 230, which processes the trigger transaction as it would any other transaction (e.g., by selecting an Application System 125 and transmitting the trigger transaction to the selected system).

As illustrated, the Application System 125 includes a Processor 250, a Memory 255, Storage 260, and a Network Interface 265. In the illustrated embodiment, Processor 250 retrieves and executes programming instructions stored in Memory 255 as well as stores and retrieves application data residing in Storage 260. Processor 250 is representative of a single CPU, multiple CPUs, a single CPU having multiple processing cores, and the like. Memory 255 is generally included to be representative of a random access memory. Storage 260 may be a disk drive or flash-based storage device, and may include fixed and/or removable storage devices, such as fixed disk drives, removable memory cards, or optical storage, network attached storage (NAS), or storage area-network (SAN). Via the Network Interface 265, the Application System 125 can be communicatively coupled with other entities including other Application Systems 125, one or more Transaction Distribution Systems 115, and the like.

Although illustrated as a physical machine, in embodiments, the functionality of the Application System 125 can be implemented as one or more physical or virtual machines, and via hardware, software, or a combination of hardware and software. Further, although a single Application System 125 is illustrated, in embodiments, there may be any number of Application Systems 125 in a given environment. In the illustrated embodiment, the Memory 255 includes a Transaction Component 270 and an ARM 130. Although illustrated as discrete components, in embodiments, the functionality of the Transaction Component 270 and ARM 130 may be combined or distributed across any number of components, and may be implemented using hardware, software, or a combination of hardware and software.

In the illustrated embodiment, the Storage 260 includes one or more Trigger Queues 290. Although illustrated as residing in Storage 260, in embodiments, the Trigger Queues 290 can be stored in any suitable location, including in Memory 255, in one or more remote locations, and the like. In an embodiment, each Trigger Queue 290 is a queue or other data structure that is related to one or more triggers. That is, in an embodiment, each Trigger Queue 290 is monitored based on a predefined trigger, and one or more trigger transactions are initiated based on the content of the Trigger Queue 290 (e.g., the size of the queue, the type of data or the content of the data stored therein, the organization or structure of the data, and the like).

In an embodiment, the Transaction Component 270 receives transactions or requests from one or more Transaction Distribution Systems 115, and executes the transaction. That is, the Transaction Component 270 performs any operations or transformations specified or required by the transaction. In embodiments, this can include reading or writing data to one or more locations or data stores (such as a Trigger Queue 290), modifying or transforming the data, transmitting data to other entities, and the like. In some embodiments, the Transaction Component 270 also processes trigger transactions once the relevant data has been retrieved. In other embodiments, the ARM 130 completes the trigger transactions, as discussed in more detail below.

As illustrated, the ARM 130 includes a Transaction Analyzer 275, a Response Component 280, and a Record Retriever 285. Although illustrated as discrete components, in embodiments, the functionality of the Transaction Analyzer 275, Response Component 280, and Record Retriever 285 may be combined or divided among any number of components, and can be implemented using hardware, software, or a combination of hardware and software. In an embodiment, the Transaction Analyzer 275 extracts and analyzes metadata associated with each transaction received at the Application System 125 in order to determine if it is a trigger transaction. If not, the Transaction Component 270 completes the transaction as normal, while the Transaction Analyzer 275 monitors the completion (e.g., by observing the Trigger Queues 290 that are configured to be monitored based on one or more triggers).

In an embodiment, if, during execution, the transaction accesses one or more of the monitored Trigger Queues 290 (e.g., via a read or write operation), the Transaction Analyzer 275 informs the Response Component 280, which collects the relevant information and transmits it to the DRM 120. For example, in an embodiment, the Response Component 280 determines a unique identifier of the affected Trigger Queue(s) 290, a unique identifier of the record(s) in the queues that were affected, and the like. Notably, in an embodiment, the identifier of the Trigger Queue 290 is unique with respect to the Application System 125 (e.g., no other Trigger Queues 290 in the Application System 125 have the same identifier), but may not be unique among all of the Application Systems 125 in the distributed system. For example, in some embodiments each Application System 125 is identically-configured. In such an embodiment, each Application System 125 may have a respective set of identically identified Trigger Queues 290. For example, each Application System 125 may have a respective Trigger Queue 290 labeled "Q1." Thus, so the DRM 120 can uniquely identify a particular record in a particular queue, the Response Component 280 can include the identity of the particular Application System 125, the identifier of the queue within that Application System 125, and the number of the record within that queue. In an embodiment, the Response Component 280 transmits these identifiers, as well as an identifier of the Application System 125. In some embodiments, the Response Component 280 further includes an indication as to the transaction that caused the update.

In an embodiment, if the Transaction Analyzer 275 determines that the received transaction is a trigger transaction (e.g., based on the metadata), the Transaction Analyzer 275 informs the Record Retriever 285, which identifies and retrieves the indicated records. In some embodiments, the Record Retriever 285 reads the metadata to determine, for each indicated record, whether it is stored locally or remotely (based on the unique identifier for the Application System 125 where the record resides). If the record is available locally, the Record Retriever 285 retrieves it for processing. If the record is available on a different Application System 125, in an embodiment, the Record Retriever 285 creates or accesses a connection to the indicated Application System 125, and retrieves the record. In one embodiment, the Record Retriever 285 retrieves all of the relevant records from each remote Application System 125 in the same connection. For example, in an embodiment, the Record Retriever 285 analyzes the metadata to identify all of the records that are stored in a particular Application System 125, accesses the communication link to that system, and requests all of the records at once. In one embodiment, upon determining that there is at least one record at the remote Application System 125, the Record Retriever 285 establishes or accesses the connection, and reads records off the designated queue until the queue is empty.

In one embodiment, once all of the records are retrieved, the ARM 130 executes the trigger transaction using the retrieved records. In some embodiments, the Record Retriever 285 informs the Transaction Component 270 that the records are available for use, and allows the Transaction Component 270 to complete the trigger transaction. In some embodiments, once the trigger transaction is completed, the Response Component 280 generates a transmission to the DRM 120 including any relevant information about the completion. For example, in one embodiment, the response indicates the trigger transaction that was completed, the Trigger Queue(s) 290 involved, and the like. In some embodiments, based on receiving this response, the DRM 120 updates the Monitoring Structure 245 (e.g., by revising the current status of the trigger, or by clearing the record details).

FIG. 3 illustrates a Monitoring Structure 245 used to efficiently handle trigger transactions, according to one embodiment disclosed herein. In the illustrated embodiment, the Monitoring Structure 245 is a table. However, in embodiments, the Monitoring Structure 245 can include any suitable data structure. As illustrated, the Monitoring Structure 245 includes a series of Entries 350A-N, where each Entry 350 includes a Transaction Name 305, a Trigger 310, a Trigger Count 315, a Trigger Transaction 320, a Current Count 325, and Write Record Details 330. In an embodiment, the Transaction Name 305 for a given Entry 350A-N is a unique identifier that identifies the type transaction which causes the trigger to be activated. For example, in an embodiment, if the trigger corresponds to a predefined number of orders being received, the Transaction Name 305 may be "New Order."

In the illustrated embodiment, the Trigger 310 identifies the data that actually causes the trigger to be set off. For example, in an embodiment, the Trigger 310 for each Entry 350 identifies the Trigger Queue(s) 290 that is monitored for the trigger. Further, as illustrated, the Trigger Count 315 indicates the predefined criteria that must be satisfied before the trigger occurs. In the illustrated embodiment, the criterion is a predefined count of records in the designated queue(s). Additionally, as illustrated, the Trigger Transaction 320 identifies the particular trigger transaction that is initiated when the predefined criteria are satisfied. In an embodiment, when an Application System 125 is initialized, the corresponding ARM 130 transmits the trigger information to the DRM 120, as discussed above. Upon receiving this information, the DRM 120 determines whether there is already an Entry 350 in the Monitoring Structure 245 that corresponds to each trigger specified in the trigger information. The DRM 120 then creates a new Entry 350 for each trigger that is not already represented in the Monitoring Structure 245.

In an embodiment, creating the Entry 350 for a trigger includes determining, from the trigger information, a Transaction Name 305, Trigger 310, Trigger Count 315, and/or Trigger Transaction 320, and including this information in the Entry 350. In one embodiment, the DRM 120 further sets the Current Count 325 and Write Record Details 330 to zero or to some other default value. In an embodiment, the Current Count 325 indicates the current state of the data that is being monitored for the trigger. In the illustrated embodiment, the relevant data is the indicated Trigger 310 (e.g., the Trigger Queue 290), and the relevant status of the data is the current number of records in the queue. As discussed above, in embodiments, the Current Count 325 indicates the number of records stored in the relevant Trigger Queue 290 of any of the Application Systems 125.

As discussed above, in an embodiment, each Application System 125 is an identically-configured application instance. Thus, in an embodiment, each Application System 125 will include a respective instance of the same Issue Queue 290 (e.g., with the same label or identifier). In the illustrated embodiment, the Current Count 325 indicates the number of records stored in the particular Trigger Queue 290 indicated by the Trigger 310, across all of the Application Systems 125. Thus, for example, if the queue Q1 of the Application System 125A includes three records, and the queue Q1 of the Application System 125B includes two records, the Current Count 325 for the Entry 350A would be five, because Entry 350A corresponds to queue Q1.

In the illustrated embodiment, the Write Record Details 330 includes an indication as to the location of each record that is relevant for the given Entry 350. In embodiments, however, the Write Record Details 330 can indicate any data that is relevant to the trigger. As illustrated, the Entry 350A indicates that a first relevant record is located in the queue Q1 (as indicated by the Trigger 310) that is associated with the Application System 125 with an identifier of "1." Further, within that queue Q1 of application system 1, the record number of the relevant record is 4. In an embodiment, when the criteria for a trigger are satisfied (e.g., the Current Count 325 equals the Trigger Count 315), the Trigger Component 240 generates a trigger transaction, includes the location of the indicated records as metadata, and transmits the trigger transaction to an Application System 125.

Figure 4:
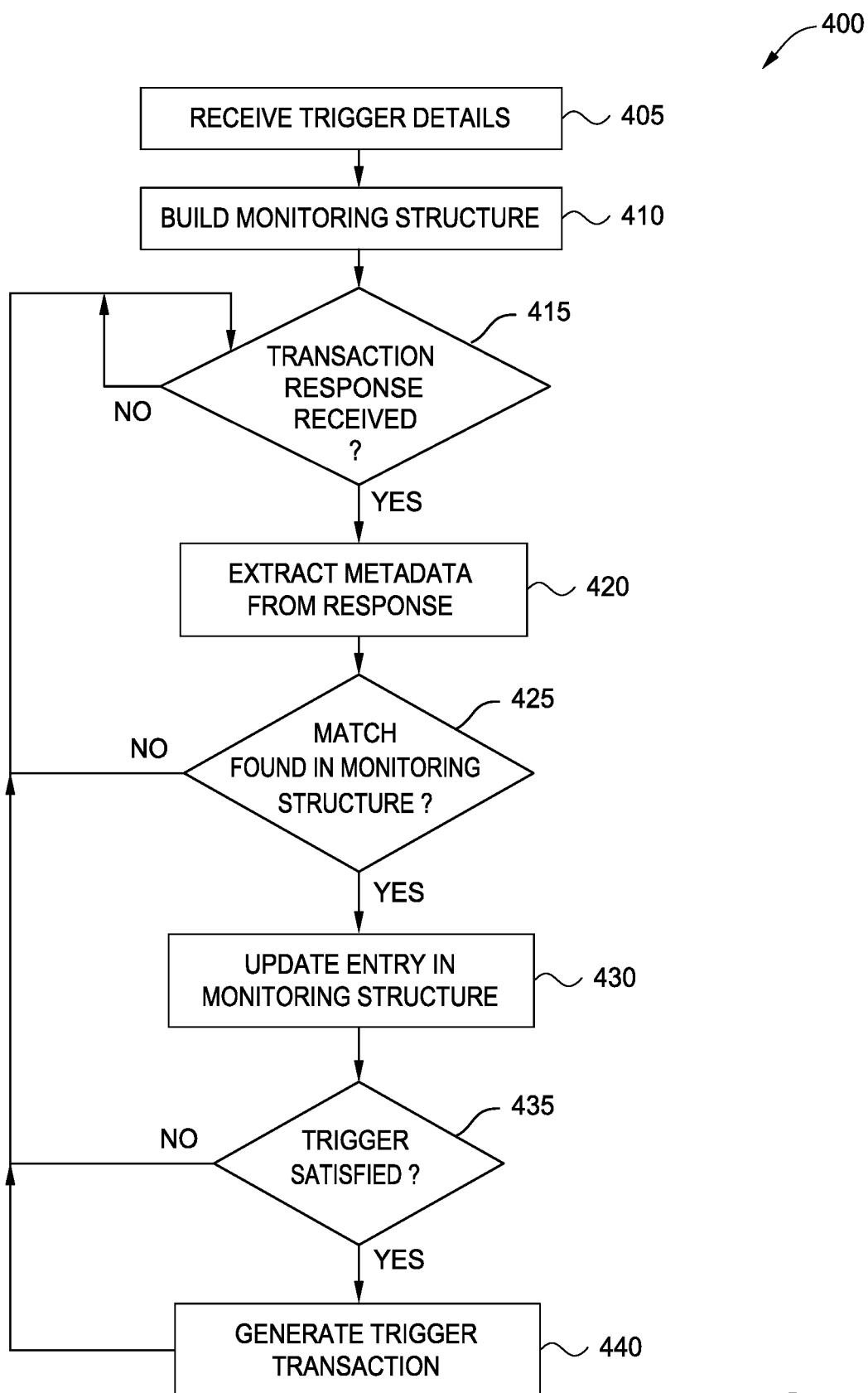
FIG. 4 is a flow diagram illustrating a method for efficiently handling trigger transactions at a distribution resource monitor, according to one embodiment disclosed herein.

FIG. 4 is a flow diagram illustrating a method 400 for efficiently handling trigger transactions at a DRM 120, according to one embodiment disclosed herein. In an embodiment, the method 400 is performed by the DRM 120 while the Transaction Distribution System 115 receives transactions from Clients 105 and distributes them as normal. The method 400 begins at block 405, where the DRM 120 receives trigger details from one or more Application Systems 125. In an embodiment, this trigger information is received when the Application System 125 (or its corresponding ARM 130) is initialized, when the DRM 120 is initialized, or at any other point during operation (e.g., if a trigger is modified or revised). At block 410, the DRM 120 builds the monitoring structure based on the trigger information, such that the relevant information can be maintained by the DRM 120.

The method 400 then proceeds to block 415, where the DRM 120 determines whether a transaction response has been received from any of the Application Systems 125. If not, the method 400 loops until a response is received. As discussed above, in an embodiment, transaction responses are transmitted by ARMs 130 whenever data that is being monitored for a predefined trigger (e.g., a Trigger Queue 290) is modified. If, at block 415, the DRM 120 determines that a transaction response has been received, the method 400 proceeds to block 420, where the DRM 120 extracts metadata from the response. In an embodiment, this metadata can include an indication as to the Application System 125 where the corresponding data is stored, a particular queue or other location (e.g., the queue identifier and record number) at the Application System 125 where the data is located, and the like. The method 400 then continues to block 425.

At block 425, the DRM 120 validates the transaction response by determining whether there is a corresponding entry in the Monitoring Structure 245. In some embodiments, for example, the ARMs 130 may transmit transaction responses for other transactions (e.g., for all completed transactions) rather than only for monitored triggers. If there is no match in the Monitoring Structure 245, the method 400 returns to block 415 to await an additional transaction response. If, however, the DRM 120 determines that there is a matching Entry 350 in the Monitoring Structure 245, the method 400 proceeds to block 430, where the DRM 120 updates the identified entry. For example, in an embodiment, the DRM 120 revises or updates the section of the entry that indicates the current status of the data (e.g., the Current Count 325). In an embodiment, the DRM 120 also updates the section of the entry that points to the relevant data (e.g., the Write Record Details 330). For example, if the transaction response indicates that a new record was inserted into queue Q1 of application system 2 at record number 4, the DRM 120 will increment the Current Count 325 and store an indication of Q1 and record number 4 in the Write Record Details 330 for the matching entry.

The method 400 then continues to block 435, where the DRM 120 determines whether the trigger is satisfied (e.g., whether the Current Count 325 matches the Trigger Count 315). If not, the method 400 returns to block 415 to await further transaction responses. If the criteria are satisfied, however, the method 400 proceeds to block 440, where the DRM 120 generates a trigger transaction for the trigger. For example, in an embodiment, the DRM 120 determines the type of transaction to create (e.g., based on the Trigger Transaction 320), and attaches metadata indicating the relevant data (from the Write Record Details 330). In embodiments, the DRM 120 can then either transmit this trigger transaction to any of the Application Systems 125, or can provide it to the Workload Manager 230, which routes it to one of the Application Systems 125.

Although not included in the illustrated embodiment, in some embodiments, when the trigger transaction is successfully completed, the ARM 130 transmits an indication of this success to the DRM 120. In such an embodiment, the DRM 120 can revise the current status entry (e.g., the Current Count 325) and the Write Record Details 330 based on this indication of success. For example, the DRM 120 can clear the Write Record Details 330 of the corresponding Entry 350, and reset the Current Count 325 to zero.

Figure 5:
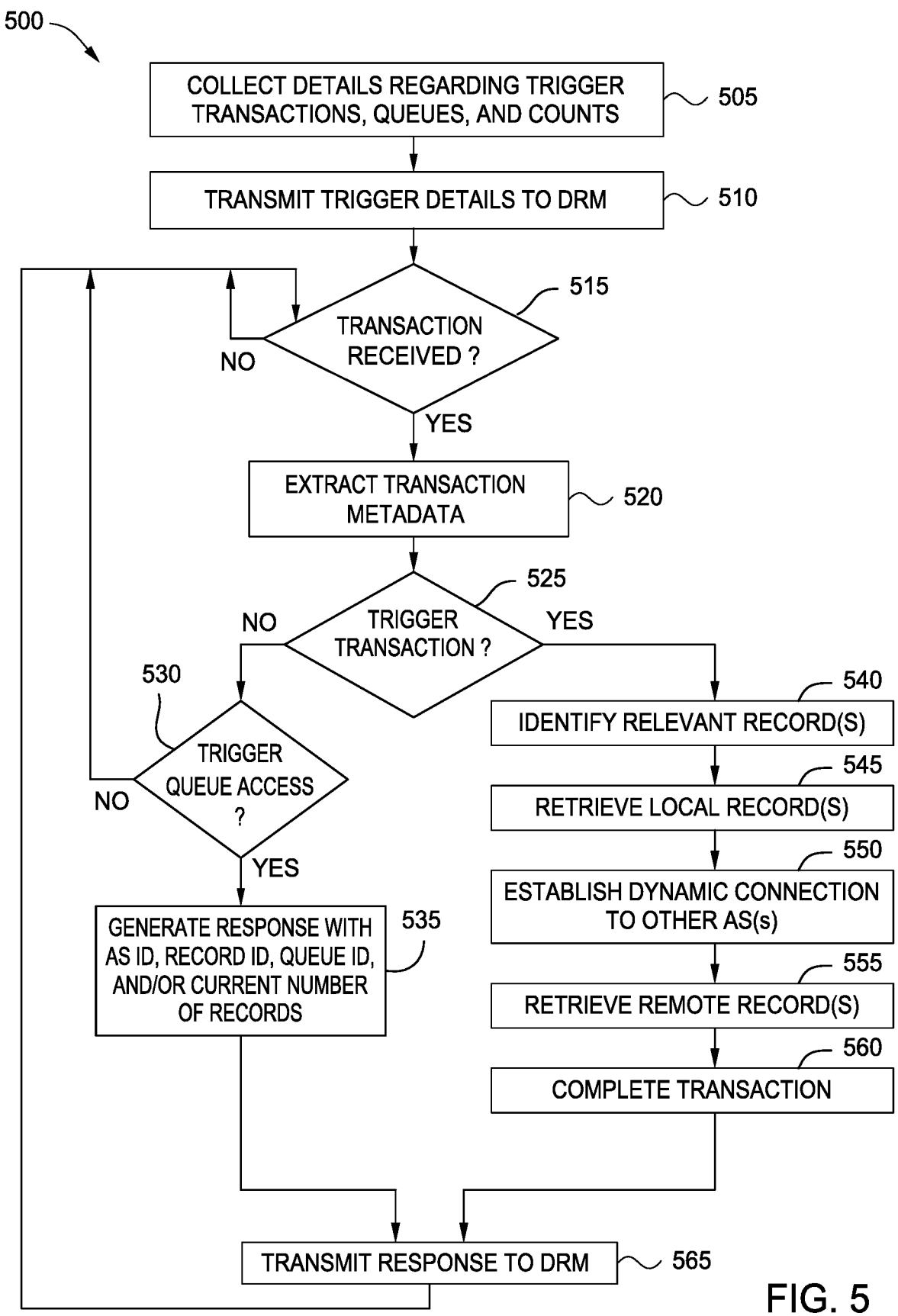
FIG. 5 is a flow diagram illustrating a method for efficiently handling trigger transactions at an application resource monitor, according to one embodiment disclosed herein.

FIG. 5 is a flow diagram illustrating a method 500 for efficiently handling trigger transactions at an ARM 130, according to one embodiment disclosed herein. The method 500 begins at block 505, where the ARM 130 collects trigger information for its Application System 125, including details regarding the data (e.g., the queues) that is monitored, the trigger transactions that are initiated based on the monitoring, the predefined criteria or conditions, and the like. The method 500 then proceeds to block 510, where the ARM 130 transmits the collected trigger details to the DRM 120. In one embodiment, blocks 505 and 510 are performed when the Application System 125 and/or ARM 130 are initialized. In some embodiments, the ARM 130 further monitors for changes or revisions to the trigger information (e.g., triggers being added, removed, or modified), and transmits information regarding these changes to the DRM 120 as well. The method 500 then proceeds to block 515.

At block 515, the ARM 130 determines whether a transaction has been received at the Application System 125. If not, the method 500 loops at block 515 until a transaction is received. If a transaction has been received, the method 500 proceeds to block 520, where the ARM 130 extracts and analyzes any metadata included with the transaction. At block 525, the ARM 130 determines whether the transaction is a trigger transaction. For example, in one embodiment, the ARM 130 can determine that the transaction is a trigger transaction because the metadata labels it as a trigger, because the metadata includes pointers to data or records to be used, or the like. If the transaction is not a trigger transaction (e.g., it is an ordinary transaction from a Client 105), the method 500 proceeds to block 530, where the ARM 130 monitors the execution of the transaction by the Transaction Component 270, and determines whether any of the monitored Trigger Queues 290 are accessed. If not, the method 500 returns to block 515.

If at least one of the Trigger Queues 290 (or some other data that is to be monitored for one or more triggers) is accessed or changed, the method 500 proceeds to block 535, where the ARM 130 awaits completion of the transaction, and then generates a response for it. In embodiments, the response can include an indication of the unique identifier of the Application System 125 associated with the ARM 130, a unique identifier of the affected record(s), a unique identifier for the queue where the record is stored, and/or an indication of the current status of the data structure (e.g., a current number of records in the queue). At block 565, where the ARM 130 transmits this response to the DRM 120. The method 500 then returns to block 515 to await another transaction.

Returning to block 525, if the ARM 130 determines that the transaction is a trigger transaction, the method 500 proceeds to block 540, where the ARM 130 identifies the relevant records that are specified in the metadata. At block 545, the ARM 130 retrieves any of the indicated records that are available locally on the corresponding Application System 125. The method 500 then continues to block 550, where, if any of the records are on a remote Application System 125, the ARM 130 establishes or accesses a dynamic connection to each such remote Application System 125. At block 555, the ARM 130 uses these connections to request and receive the indicated records from the remote Application System(s) 125. The method 500 then proceeds to block 560, where the ARM 130 completes the trigger transaction (or facilitates the Transaction Component 270 completing the trigger transaction).

In some embodiments, when the data is stored (e.g., when a record is added to a queue), a timestamp is included. In one embodiment, when the ARM 130 retrieves the indicated records, this timestamp is included. In an embodiment, the timestamp of each record is then used to order the records such that they are processed in the correct order, regardless of the Application System 125 they are retrieved from, or the order in which they are retrieved. In some embodiments, the method 500 then returns to block 515 to await a new transaction. In the illustrated embodiment, however, the method 500 then proceeds to block 565, where the ARM 130 generates and transmits a response to the DRM 120 indicating that the trigger transaction has been successfully completed.

Figure 6:
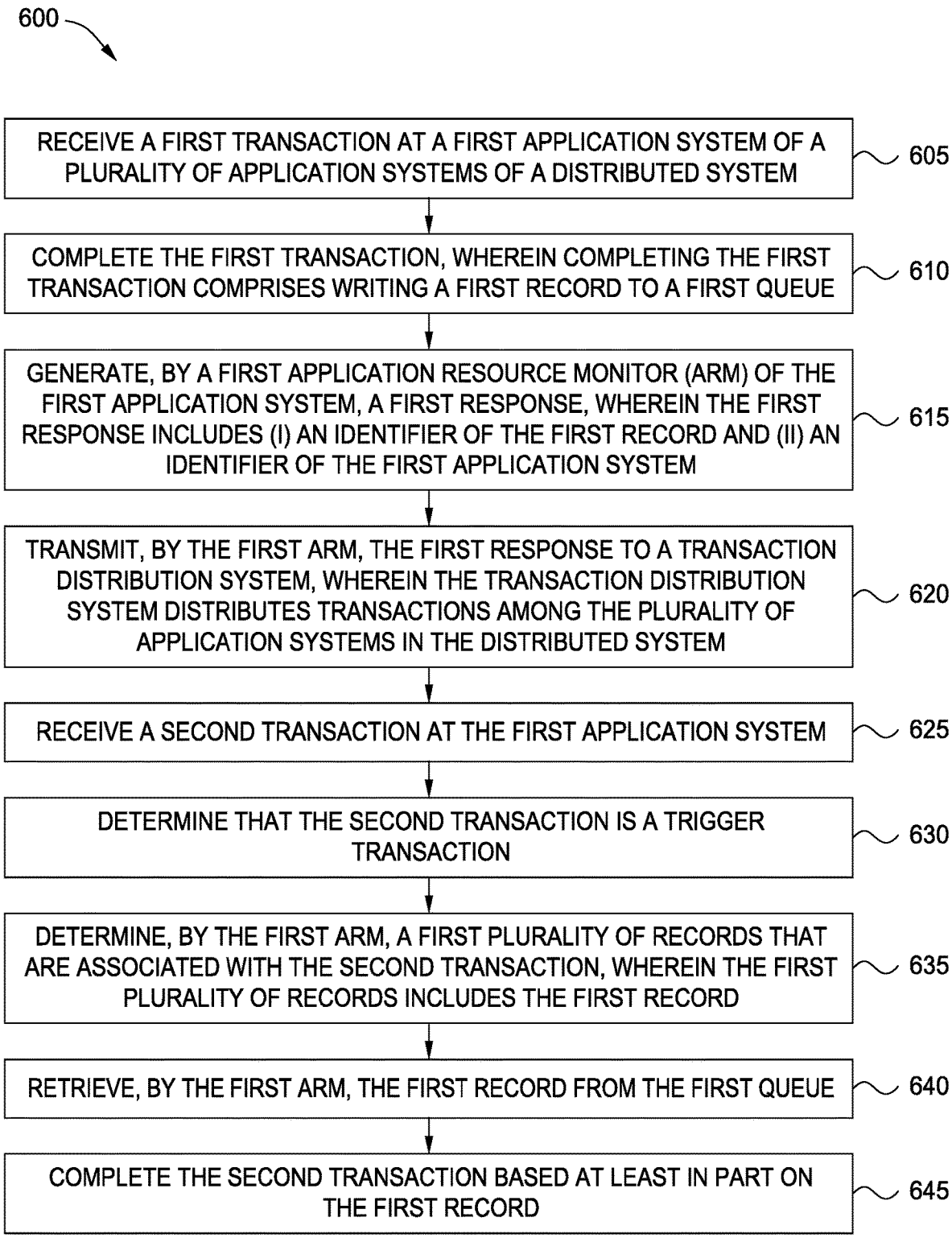
FIG. 6 is a flow diagram illustrating a method for efficient resource handling, according to one embodiment disclosed herein.

FIG. 6 is a flow diagram illustrating a method 600 for efficient resource handling, according to one embodiment disclosed herein. The method 600 begins at block 605, where a first transaction is received at a first Application System 125 of a plurality of application systems of a distributed system. At block 610, the Application System 125 completes the first transaction, wherein completing the first transaction comprises writing a first record to a first queue. The method 600 then proceeds to block 615, where an ARM 130 of the first application system generates a first response, wherein the first response includes (i) an identifier of the first record and (ii) an identifier of the first Application System 125. Further, at block 620, the ARM 130 transmits the first response to a Transaction Distribution System 115, wherein the Transaction Distribution System 115 distributes transactions among the plurality of Application Systems 125 in the distributed system. At block 625, the Application System 125 receives a second transaction at the first Application System 125. The method 600 then proceeds to block 630, where the ARM 130 determines that the second transaction is a trigger transaction. At block 635, the ARM 130 determines a first plurality of records that are associated with the second transaction, wherein the first plurality of records includes the first record. Additionally, at block 640, the ARM 130 retrieves the first record from the first queue. Finally, the method 600 continues to block 645, where the second transaction is completed based at least in part on the first record.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DRM 120 and/or ARM 130) or related data available in the cloud. For example, the DRM 120 and/or ARM 130 could execute on a computing system in the cloud and enable efficient handling of trigger transactions. In such a case, the DRM 120 and/or ARM 130 could monitor transactions in a distributed system, and store monitoring structures and trigger queues at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first transaction at a first application system of a plurality of application systems of a distributed system;
completing the first transaction, wherein completing the first transaction comprises writing a first record to a first queue;
generating, by a first application resource monitor (ARM) of the first application system, a first response, wherein the first response includes (i) an identifier of the first record and (ii) an identifier of the first application system;
transmitting, by the first ARM, the first response to a transaction distribution system, wherein the transaction distribution system distributes transactions among the plurality of application systems in the distributed system;
receiving a second transaction at the first application system;
upon determining that the second transaction is a trigger transaction:
determining, by the first ARM, a first plurality of records that are associated with the second transaction, wherein the first plurality of records includes the first record;
retrieving, by the first ARM, the first record from the first queue; and
completing the second transaction based at least in part on the first record;
receiving a third transaction at the first application system; and
upon determining that the third transaction is not a trigger transaction and will not access the first queue:
completing the third transaction; and
refraining from transmitting a response to the transaction distribution system.

2. The method of claim 1, wherein the first response further includes (i) an identifier of the first queue and (ii) a number of records currently stored in the first queue.

3. The method of claim 1, the method further comprising:
determining, by the first ARM, that a second record in the first plurality of records is stored in a second application system of the plurality of application systems;
creating, by the first ARM, a dynamic connection to the second application system; and
retrieving, by the first ARM, the second record via the dynamic connection, wherein completing the second transaction is further based on the second record.

4. The method of claim 3, the method further comprising:
closing the dynamic connection to the second application system.

5. The method of claim 1, the method further comprising:
upon completing the second transaction, transmitting an indication of success to the transaction distribution system.

6. The method of claim 1, the method further comprising:
receiving, at a distribution resource monitor (DRM) associated with the transaction distribution system, the first response;
identifying a first entry in a records table, based on the first response;
updating the first entry by incrementing a current record count associated with the first entry; and
upon determining that the current record count matches a predefined trigger count:
generating the second transaction; and
transmitting the second transaction to the first application system.

7. The method of claim 6, wherein updating the first entry further comprises storing (i) the identifier of the first record and (ii) the identifier of the first application system.

8. A computer-readable storage medium having computer-readable program code embodied therewith, the computer-readable program code executable by one or more computer processors to perform an operation comprising:
receiving a first transaction at a first application system of a plurality of application systems of a distributed system;
completing the first transaction, wherein completing the first transaction comprises writing a first record to a first queue;
generating, by a first application resource monitor (ARM) of the first application system, a first response, wherein the first response includes (i) an identifier of the first record and (ii) an identifier of the first application system;
transmitting, by the first ARM, the first response to a transaction distribution system, wherein the transaction distribution system distributes transactions among the plurality of application systems in the distributed system;
receiving a second transaction at the first application system;
upon determining that the second transaction is a trigger transaction:
determining, by the first ARM, a first plurality of records that are associated with the second transaction, wherein the first plurality of records includes the first record;
retrieving, by the first ARM, the first record from the first queue; and
completing the second transaction based at least in part on the first record;
receiving a third transaction at the first application system; and
upon determining that the third transaction is not a trigger transaction and will not access the first queue:
completing the third transaction; and
refraining from transmitting a response to the transaction distribution system.

9. The computer-readable storage medium of claim 8, the operation further comprising:
determining, by the first ARM, that a second record in the first plurality of records is stored in a second application system of the plurality of application systems;
creating, by the first ARM, a dynamic connection to the second application system; and
retrieving, by the first ARM, the second record via the dynamic connection, wherein completing the second transaction is further based on the second record.

10. The computer-readable storage medium of claim 8, the operation further comprising:
upon completing the second transaction, transmitting an indication of success to the transaction distribution system.

11. The computer-readable storage medium of claim 8, the operation further comprising:
receiving, at a distribution resource monitor (DRM) associated with the transaction distribution system, the first response;
identifying a first entry in a records table, based on the first response;

updating the first entry by incrementing a current record count associated with the first entry; and upon determining that the current record count matches a predefined trigger count:
  generating the second transaction; and
  transmitting the second transaction to the first application system.

12. The computer-readable storage medium of claim 11, wherein updating the first entry further comprises storing (i) the identifier of the first record and (ii) the identifier of the first application system.

13. A system comprising:
one or more computer processors; and
a memory containing a program which when executed by the one or more computer processors performs an operation, the operation comprising:
  receiving a first transaction at a first application system of a plurality of application systems of a distributed system;
  completing the first transaction, wherein completing the first transaction comprises writing a first record to a first queue;
  generating a first response, wherein the first response includes (i) an identifier of the first application system, (ii) an identifier of the first queue, (iii) a number of records currently stored in the first queue, and (iv) an identifier of the first record;
  transmitting the first response to a transaction distribution system;
  receiving a second transaction at the first application system;
  upon determining that the second transaction is a trigger transaction:
    determining a first plurality of records that are associated with the second transaction, wherein the first plurality of records includes the first record;
    retrieving the first record from the first queue; and
    completing the second transaction based at least in part on the first record;
  receiving a third transaction at the first application system; and
  upon determining that the third transaction is not a trigger transaction and will not access the first queue:
    refraining from transmitting a response to the transaction distribution system.

14. The system of claim 13, the operation further comprising:
determining that a second record in the first plurality of records is stored in a second application system of the plurality of application systems;
creating a dynamic connection to the second application system; and
retrieving the second record via the dynamic connection, wherein completing the second transaction is further based on the second record.

15. The system of claim 13, the operation further comprising:
completing the third transaction.

16. The system of claim 13, the operation further comprising:
upon completing the second transaction, transmitting an indication of success to the transaction distribution system.

17. The system of claim 13, the operation further comprising:
receiving, at a distribution resource monitor (DRM) associated with the transaction distribution system, the first response;
identifying a first entry in a records table, based on the first response;
updating the first entry by incrementing a current record count associated with the first entry; and
upon determining that the current record count matches a predefined trigger count:
  generating the second transaction; and
  transmitting the second transaction to the first application system.

18. The system of claim 17, wherein updating the first entry further comprises storing (i) the identifier of the first record and (ii) the identifier of the first application system.

* * * * *